Dec. 1, 1970   W. LESTER ET AL   3,544,171
ANTI-SKID DEVICE FOR HYDRAULIC BRAKE SYSTEM
Filed Feb. 20, 1969   4 Sheets-Sheet 1

INVENTORS
Waldemar Lester
Lennart Bror Anders Swidén
BY
ATTORNEY

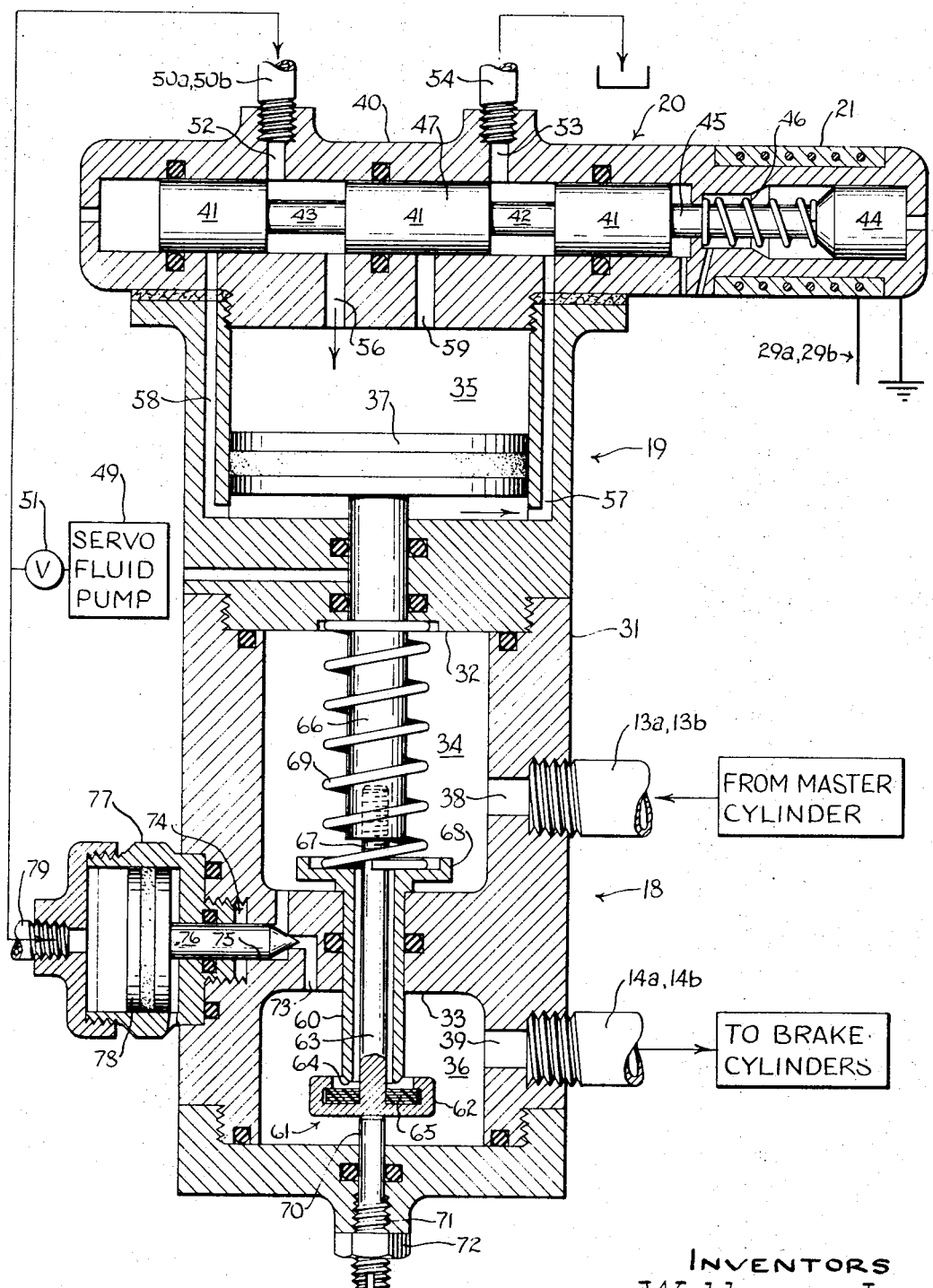

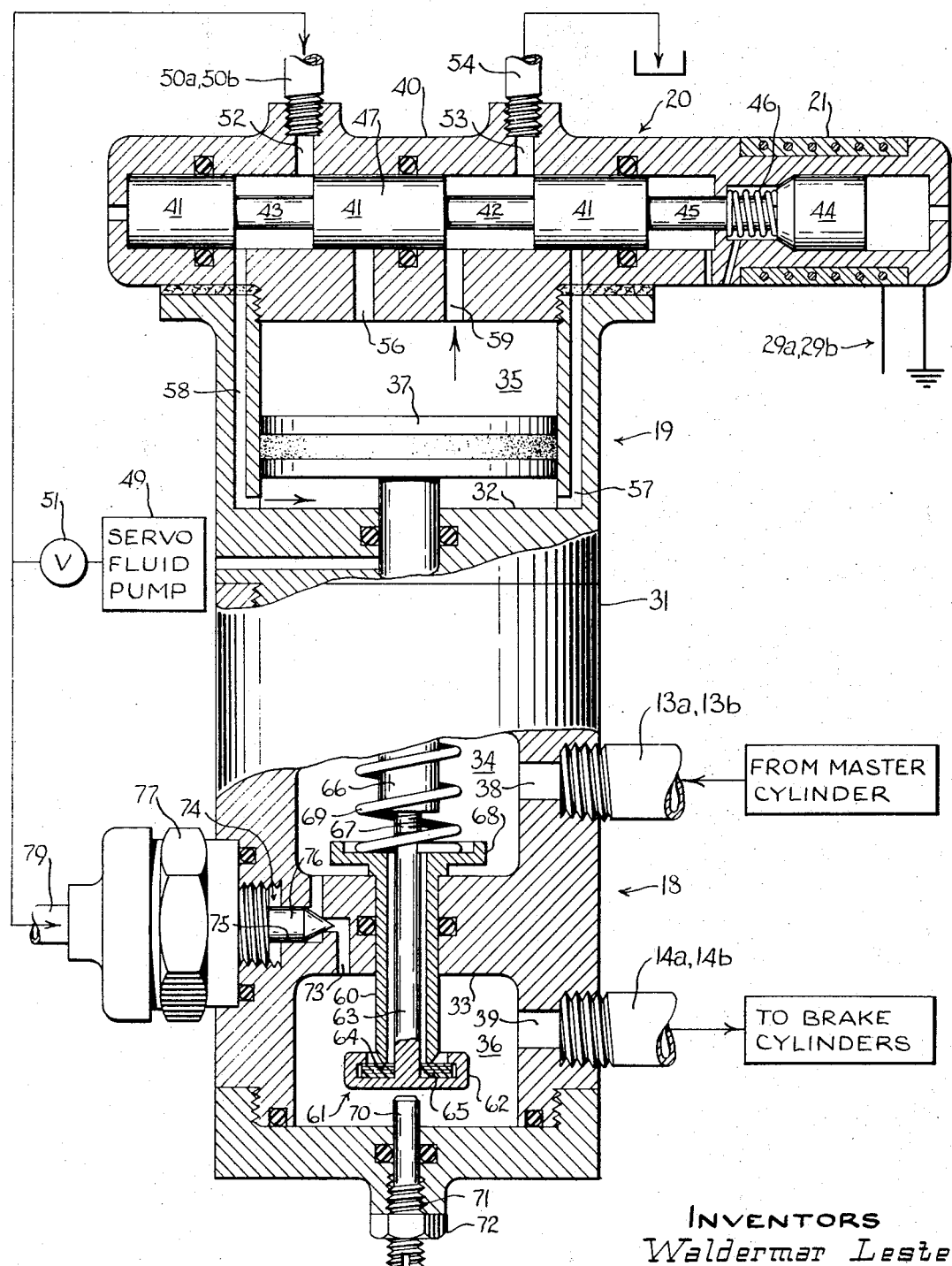

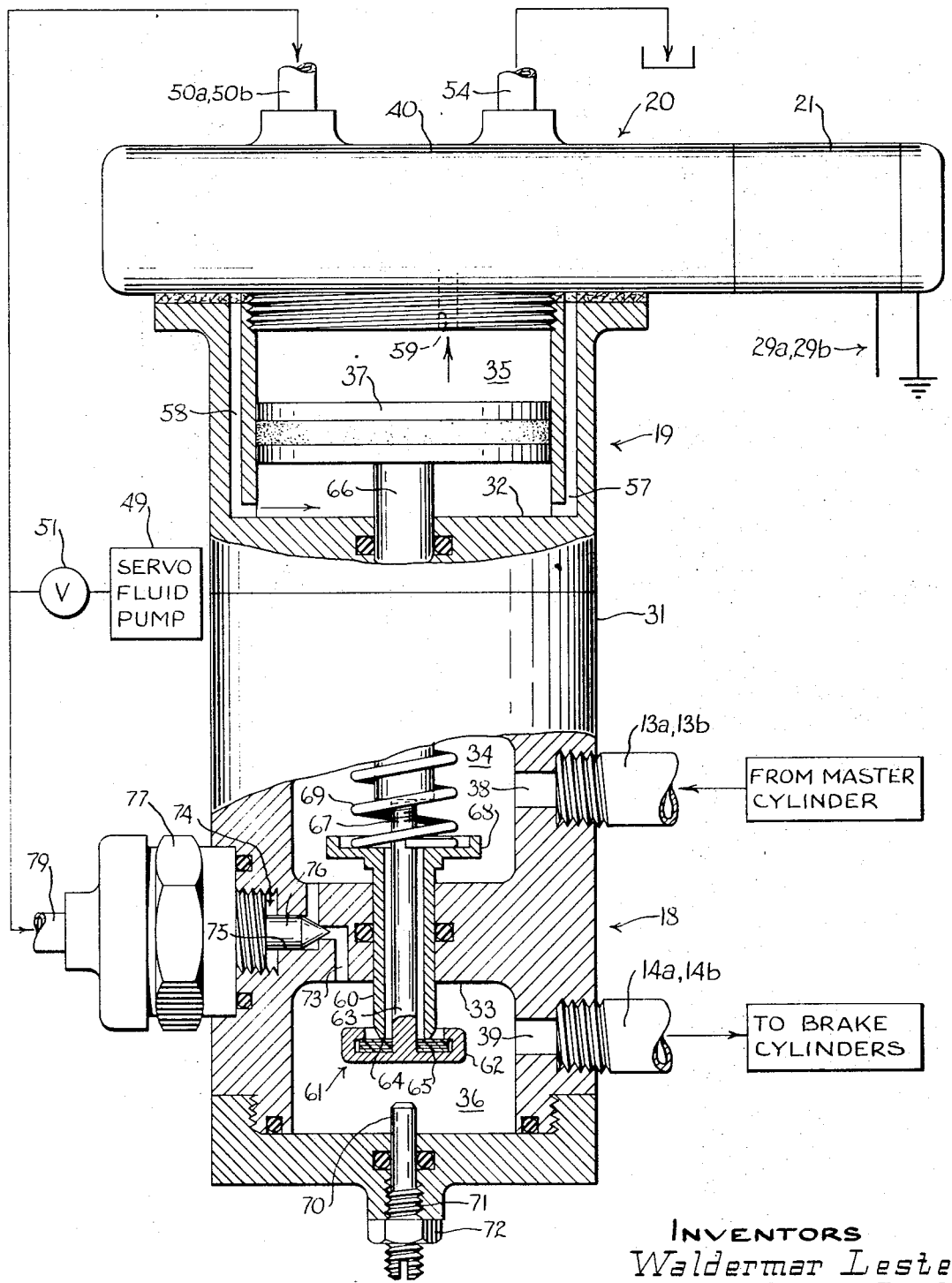

3,544,171
ANTI-SKID DEVICE FOR HYDRAULIC
BRAKE SYSTEM
Waldermar Lester, Bondegatan 11B, Linkoping, Sweden, and Lennart Bror Anders Swiden, Idrottsvagan 27, Vreta, Kloster, Sweden
Filed Feb. 20, 1969, Ser. No. 801,043
Claims priority, application Sweden, Feb. 26, 1968, 2,432/68
Int. Cl. B60t 8/06
U.S. Cl. 303—21                 7 Claims

ABSTRACT OF THE DISCLOSURE

The anti-skid device has an inlet chamber connected with the master cylinder, an outlet chamber connected with the brake cylinder, and a sleeve slideable in a partition between said chamber and normally projecting into the outlet chamber. A poppet has a head in the outlet chamber, normally spaced from the sleeve, and a stem extending through the sleeve with clearance and connected with a servo which so moves in response to an electrical output signifying excessive brake force as to first engage the head against the sleeve, blocking fluid flow therethrough, then draw the sleeve outwardly of the outlet chamber to increase its volume. The sleeve is biased toward the outlet chamber to follow the poppet in servo actuated return motion.

---

This invention relates to hydraulic brake systems for wheeled vehicles, and more particularly to anti-skid means for such brake systems whereby braking force upon a wheel is relieved whenever it decelerates so rapidly that there is danger of its locking and skidding.

It is well known that during the braking of a wheeled vehicle, such as an automobile, a locked wheel is not only relatively ineffective to declerate the vehicle but is incapable of contributing to directional control of the vehicle, and it therefore encourages skidding and sliding. Under extreme emergency conditions the driver of a vehicle instinctively tends to apply its brakes with maximum force, and thus tends to lock the wheels and create the very conditions of poor deceleration and lack of directional control that he is most anxious to avoid.

With this in mind, certain anti-skid devices have been proposed that partially override the driver's control of the brake system whenever a wheel or wheels tend to lock, relieving brake actuating force to the extent necessary to prevent wheel locking.

Usually such an anti-skid arrangement incorporates a monitoring device at each wheel, responsive to the rotational speed of the wheel, which produces an output whenever the wheel is decelerated so rapidly that its locking is probable. In response to such output, a servo actuated device affords a limited relief of brake fluid pressure at the brake cylinder for the affected wheel, to ease braking force to the extent necessary to prevent wheel locking. Normally the servo actuated device is connected in the brake fluid hydraulic circuit, brake cylinder and the driver-controlled master cylinder by which brake fluid is pressurized.

When an anti-skid device of this character is operative, it tends to produce rather rapid fluctuations in the pressure of the brake fluid supplied to the brake cylinder, since it can only override an excessive pressure and must allow pressure at the brake cylinder to reach the maximum value at which effective braking can be achieved without locking of the wheels. These fluctuations are not undesirable, and they do not interfere with jerk-free "soft" but positive braking, provided that they occur very rapidly and are of relatively small, precisely controlled magnitude. If they are too large or too low in frequency, they can give rise to unpleasant and even dangerous mass forces which act upon the vehicle and its occupants. Hence it is an essential requirement of an anti-skid device in a braking system that it respond very rapidly to monitoring device outputs and that its responses be very precise.

It is also imperative that an anti-skid device intended for vehicles operated on public streets and roads be arranged to fail safe, that is, in the event of its failure it should not interfere with the normal transfer of brake fluid back and forth between the master cylinder and the brake cylinders, so that conventional braking operation is possible when the anti-skid device is disabled.

Anti-skid devices heretofore available have fulfilled these requirements only in part. In one known form of such device the servo that responded to monitoring device output effected variations in the volume of a chamber in the hydraulic circuit between the master cylinder and the brake cylinders. An effective increase in the volume of that chamber decreased brake fluid pressure at the brake cylinder and correspondingly decreased the force with which the brake shoe was applied. In that known device, the servo had a positive action in the direction to decrease the chamber volume, but it had an impositive action in the direction to increase the effective volume of the chamber, in that the existing brake fluid pressure at the brake cylinder was relied upon to cause outwardly displacing motion of a chamber defining element, but such motion was opposed by the pressure medium for the servo system, flowing to an ungoverned drain. Because the chamber-enlarging motion of the movable chamber defining element resulted from the opposition of two forces that were both of indefinite magnitude, the rapidity and precision of operation of the anti-skid device were not as great as desired.

Another known type of anti-skid device has servo actuated valve means arranged to open and close for control of communication between the master cylinder and the brake cylinder. If the servo controlled valve means was for any reason locked in its closed position, pressure that the driver applied to the brake fluid at the master cylinder could not be transferred to the brake cylinder, and the brakes were rendered substantially inoperative.

By contrast with previously known anti-skid devices, the present invention has for its object to provide an anti-skid device, particularly for hydraulic brake systems, that meets the requirements for comfort, security and safety in providing very rapid and precise responses to outputs from the monitoring devices, and which fails safe.

Another and more specific object of this invention is to provide an anti-skid device for a hydraulic brake system in a motor vehicle, actuated by a hydraulic servo that requires such a small amount of presure fluid that the oil pump of the vehicle engine can be used as the source of such servo fluid without any likelihood that lubrication of the engine will be adversely affected.

Another specific object of this invention is to provide an anti-skid device for a hydraulic brake system in which brake fluid supplied to a brake cylinder is pressurized at an operator actuated master cylinder, which device comprises an anti-skid mechanism having a servo-actuated valve that controls communication between the master cylinder and the brake cylinder, and servo actuated means for both increasing and decreasing the effective volume of a brake fluid presure control chamber which is at all times communicated with the brake cylinder, said anti-skid device being so arranged that as soon as excessive deceleration of a braked wheel is detected, the servo actuated valve is closed to prevent pressure applied to fluid at the master cylinder from being imposed upon the brake cylinder, and thereafter the volume of said chamber is steadily increased until the tendency toward wheel locking has been relieved; whereas upon acceleration of the wheel the chamber volume is first decreased back to normal before the servo-actuated valve is reopened.

A further and very important object of this invention is to provide an anti-skid device in which both increasing and decreasing change in the volume of a brake fluid presure control chamber is effected by positive servo actuation of a movable chamber defining member.

It is also a specific object of this invention to provide an anti-skid device that achieves the objects above set forth and which has a passage that is in by-pass relation to the servo-actuated valve and a pressure responsive security valve which controls said passage and which is normally maintained closed by the pressure of servo system fluid, so that the device will fail safe upon failure of pressure in the servo system in that brake fluid can flow between the master cylinder and the brake cylinder through said passage, even though the servo-actuated valve may be closed.

It is also a specific object of this invention to provide an easily adjusted anti-skid device of the character described that is simple, compact, inexpensive and reliable.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIG. 2 is a view, partly in side elevation but mainly in vertical section, of a non-skid device of this invention, shown in the normal condition that it has when the brake pedal is not applied or is applied very lightly;

FIG. 3 is a view generally similar to FIG. 2 but showing conditions that exist when the anti-skid device is in the initial stage of ts operation to relieve excessive braking force to prevent wheel skidding; and FIG. 4 is a view generally similar to FIG. 3 but showing conditions that exist when the anti-skid device is in a further stage of its action to relieve braking force.

Figure 1:
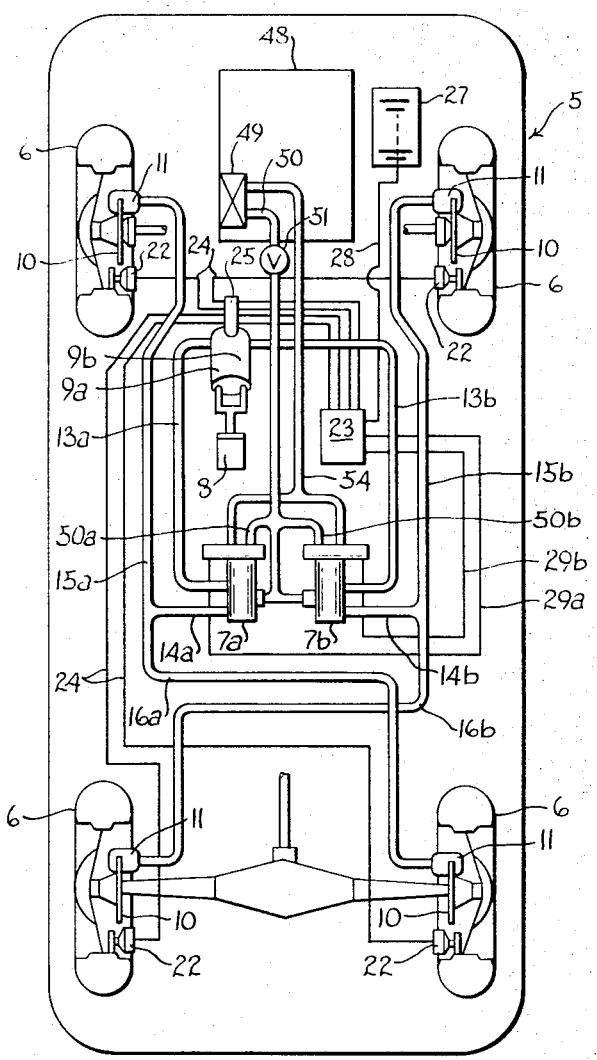
FIG. 1 is a diagrammatic view of an automobile hydraulic brake system embodying the principles of this invention.

Referring now more particularly to the accompanying drawings, FIG. 1 depicts an automobile 5 having wheels 6 that can be braked under the control of the driver by means of a hydraulic braking system incorporating anti-skid devices 7a, 7b of this invention. For purposes of illustration the invention is herein shown and described as embodied in an automobile, but it will be understood that the invention is equally well applicable to an airplane, or to any other wheeled vehicle, or, indeed, to any device having a rotatable member which must be capable of being braked under the control of an operator and which should be prevented from being decelerated too rapidly.

As is conventional, the brake system has a brake pedal 8 which is intended to be depressed by the driver when he wishes to brake the wheels 6. In this case the vehicle is illustrated as having a dual braking system, comprising a pair of master cylinders 9a and 9b which are actuated simultaneously by the pedal 8; and each of its wheels 6 has a brake mechanism of the disc type, comprising a disc 10 that rotates with the wheel and a hydraulic actuator or brake cylinder 11 that is secured to the car structure adjacent to the wheel. One master cylinder 9a controls the brake cylinders for the left front and right rear wheels, and the other master cylinder 9b controls the brake cylinders for the other diagonally opposite pair of wheels.

The manner in which the master cylinders cooperate with the brake cylinders 11 is generally conventional and therefore needs no detailed description or illustration. Briefly, when the pedal 8 is depressed, it actuates a piston in each master cylinder to pressurize brake fluid in the brake system; and such pressurized fluid, in turn, actuates a piston in each brake cylinder that urges a brake shoe into frictional engagement with the disc 10. The pistons in the brake cylinders are spring biased to normal positions in which the brake shoes are held clear of the discs.

The anti-skid devices 7a and 7b are connected in the brake hydraulic system between the master cylinders 9a and 9b and the brake cylinders 11 that are controlled by them. Specifically, a brake fluid duct 13a connects the master cylinder 9a with the anti-skid device 7a; and a duct 14a, having branches 15a and 16a, connects the device 7a with the brake cylinders of the left front and right rear wheels. Similarly, a duct 13b connects master cylinder 9b with anti-skid device 7b, and a duct 14b, having branches 15b and 16b, connects that anti-skid device with the other two brake cylinders.

Each of the anti-skid devices 7a and 7b, as more particularly described hereinafter, comprises a brake fluid pressure control unit 18 which is actuated by a hydraulic servo 19; and the servo, in turn, is governed by a two-position control valve 20 that is actuated by a solenoid 21. A monitoring device 22 at each wheel controls energization of the solenoids 21.

Each of the monitoring devices 22 is of a known type which responds to the rotational speed of its wheel to produce an electrical output that is fed to an electrical control instrumentality 23 by way of a conductor 24. Since the outputs of the monitoring devices should not affect the anti-skid devices 7a and 7b at times when the brake pedal 8 is not actuated, a normally-open four-pole single-throw switch mechanism 25 is in the circuit of the conductors 24 and is mechanically linked to the brake pedal to be closed thereby when the brake pedal is depresesd.

The electrical control instrumentality 23 effects energization of the solenoid 21 of the appropriate anti-skid device 7a or 7b whenever the output from one of the monitoring devices 22 signals such rapid deceleration of a wheel that there is likelihood of its being locked. To this end the control instrumentality is connected with the battery 27 of the automobile by means of a conductor 28, and output conductors 29a and 29b connect the control instrumentality with the solenoids 21 of the anti-skid devices 7a and 7b, respectively.

In general, each anti-skid device 7a and 7b comprises an elongated hollow main body 31 having a pair of transverse partitions 32 and 33 therein that define a medial inlet chamber 34, a cylindrical servo chamber 35 at one side of the inlet chamber, and an outlet chamber 36 at the other side of the inlet chamber.

The inlet chamber 34 has a brake fluid inlet port 38 that is at all times communicated with a master cylinder 9a or 9b by means of the duct 13a or 13b; while the outlet chamber 36 has a brake fluid outlet port 39 that is at all times communicated with a pair of brake cylinders by means of the duct 14a or 14b and its associated branch ducts. Communication between the inlet chamber 34 and the outlet chamber 36 is controlled (as explained hereinafter) by the brake fluid pressure control unit 18, which extends through the partition 33 between said chambers. The servo 19 which actuates the pressure control unit 18 comprises a piston 37 slideable in the cylindrical servo chamber 35.

The solenoid 21 and the two-position control valve 20 that it actuates are housed in an elongated control valve body 40 that can extend transversely across the servo end of the partitioned main body 31 and can form the outer end wall of the cylindrical servo chamber 35.

The control valve comprises a spool 47 which is slidable in a closely fitting bore in the control valve body and which has three lands 41 and two reduced diameter portions or grooves 42 and 43. At one end the spool is rigidly coaxially connected to the plunger 44 of the solenoid by means of a stem portion 45. A coiled expansion spring 46 that surrounds the stem portion 45 reacts between the plunger 44 and an annular seat in the control valve body 40 to urge the plunger and spool toward their normal positions shown in FIG. 2.

The control valve governs the flow of pressurized servofluid to and from the servo 19. Such servo fluid can be obtained from any suitable source that will normally maintain it under substantially constant pressure when the engine 48 of the vehicle is running. In this instance the servo fluid source is illustrated as the conventional oil pump 49 of the engine 48, which can be used for this purpose because the volume of oil needed for the servo of the anti-skid device is so small that such diversion of engine oil is not likely to affect engine lubrication. Accordingly, the engine oil pump 49 is connected, by means of a duct 50 and through a check valve 51, with a servo fluid inlet port 52 in the control valve body 40. The duct 50 has branches 50a and 50b which conduct servo fluid to both of the anti-skid devices 7a and 7b. Return fluid from the servo 19 passes out of the control valve body through a drain port 53 therein that is connected, through a manifolded duct 54, with the engine oil sump or a similar reservoir from which the pump 49 can be supplied.

With the control valve spool 47 in its normal position, illustrated in FIG. 2, the groove 43 in the spool communicates the servo fluid inlet port 52 with the mouth of an inlet passage 56 that leads to the outer end of the servo cylinder, while the mouth of a return fluid passage 57 that leads from the inner end of the cylinder is communicated, through the spool groove 42, with the drain port 53. Servo fluid then acts to urge the servo piston 37 toward its extreme inward position. Upon energization of the solenoid, the spool 47 is moved, against the bias of spring 46, to its position shown in FIGS. 3 and 4, in which the flow of servo and return fluids is such that the servo piston is moved outwardly, away from the partition 32, the servo fluid inlet port 52 being then communicated through the groove 43 in the spool with the mouth of an inlet passage 58 that leads to the inner end of the servo cylinder, and the drain port 53 being communicated through the groove 42 with a return fluid passage 59 that leads from the outer end of the cylinder.

The brake fluid pressure control unit 18, which is actuated by the servo piston 37, controls the flow of brake fluid between the master cylinder and its brake cylinders and varies the effective volume of the outlet chamber 36 to regulate the pressure of brake fluid acting upon the brake cylinders connected therewith. The brake fluid pressure control unit comprises a sleeve member 60 which is endwise slideable in a closely fitting bore through the partition 33 between the inlet and outlet chambers, and a poppet valve 61 that has an enlarged head 62 in the outlet chamber and a coaxial stem 63 that extends lengthwise through the sleeve member. Attention is directed to the fact that the sleeve member projects beyond the partition 33 at both sides thereof, so that one end portion of the sleeve member is always in the inlet chamber 34 and its other end portion is always in the outlet chamber 36 and normally projects a substantial distance thereinto.

Normally, brake fluid is constrained to flow bewteen the inlet chamber 34 and the outlet chamber 36 through the bore in the sleeve member 60, and the stem 63 of the poppet valve therefore has a diameter smaller than that of said bore, to provide clearance for such flow. However, the end of the sleeve member that is in the outlet chamber is formed to provide an annular valve seat 64 against which the head 62 of the poppet valve can engage to block flow of fluid between the inlet and outlet chambers. The valve face of the head 62 can be provided by a washer 65 of a resilient plastic material to make good sealing engagement with the valve seat 64.

The stem of the poppet valve is rigidly connected with the servo piston 37 by means of a coaxial rod-like connecting member 66 which extends through a closely fitting bore in the partition 32. For reasons explained hereinafter, the diameter of the connecting member 66 is equal to the outside diameter of the sleeve member 60. The rigid connection between the poppet and the connecting member 66 can comprise a threaded end portion 67 on the stem of the poppet, received in a correspondingly threaded coaxial well in the connecting member.

To define the limit of movement of the sleeve member into the outlet chamber 36, there is an enlarged head 68 on the portion of the sleeve member 60 that is within the inlet chamber 34, engageable against the partition 33. An expansion spring 69, surrounding the connecting member, reacts between the partition 32 and the head 68 on the sleeve member to bias the sleeve member toward that limit of its motion, thus urging it toward what can be considered its normal position. It will be observed that the portion of the sleeve member that projects into the outlet chamber, in cooperation with the head 62 of the poppet, constitutes a part of the means that defines said chamber, and that motion of the brake fluid pressure control unit 18 effectively varies the volume of the outlet chamber.

It will now be apparent that when the solenoid 21 is energized, the initial outward motion of the servo piston 37 actuates the poppet to bring its head 62 into engagement with the valve seat 64 on the sleeve member, closing off communication between the inlet chamber 34 and the outlet chamber 36 and hence blocking communication between the master cylinder that is connected with the anti-skid device and its brake cylinders, as illustrated in FIG. 3. Continued outward motion of the servo piston (FIG. 4) causes the poppet to push the sleeve member axially in the direction out of the outlet chamber, against the bias of the expension spring 69, thus increasing the effective volume of the outlet chamber and consequently relieving pressure of brake fluid in the brake cylinders connected therewith. When braking force is thus eased to the extent that the affected monitor device no longer produces an output, the solenoid 21 is deenergized, the control valve spool 47 returns to its normal (FIG. 2) position under the biasing force of its spring 46, and the servo piston moves inwardly in response to the reversal of the force exerted upon it by servo fluid. The poppet, of course, moves in unison with the servo piston, and the sleeve member follows the poppet in the direction into the outlet chamber, being maintained in engagement with the head of the poppet under the biasing force of the expansion spring 69. Such motion of the brake fluid pressure control unit of course decreases the effective volume of the outlet chamber and increases brake fluid pressure at the brake cylinders connected therewith.

The solenoid 21 is deenergized either by increase in the speed of wheel rotation to terminate output from the monitoring device 22 or by release of the brake pedal 8 to open the circuit through the switch mechanism 25.

If the solenoid remains unenergized after the sleeve member reaches its normal position, in which its head 68 is engaged against the partition 33, the poppet continues to move into the outlet chamber, and its head 62 is thus carried out of engagement with the valve seat 64 on the sleeve member, permitting communication between the inlet and outlet chambers through the bore in the sleeve member and therefore reestablishing communication between the master cylinder and brake cylinders that are connected with the anti-skid device.

In many cases the solenoid 21 will be reenergized before the sleeve member reaches its normal position, and the brake fluid pressure control unit will rapidly oscillate back and forth with the poppet closed, increasing and decreasing the effective volume of the outlet chamber until the brake pedal is released or the wheel achieves faster rotation by reaching a surface that affords better traction.

The normal position of the poppet, which establishes the spacing between its head 62 and the seat 64 on the sleeve member, can be adjusted by means of a stop pin 70 that projects coaxially into the outlet chamber and is screw threaded into the outer end wall of the outlet chamber, as at 71, being secured in any desired position of axial adjustment by means of a lock nut 72.

Because the connecting member 66 which extends through the inlet chamber 34 has a diameter equal to the outside diameter of the sleeve member 60, the inlet chamber undergoes substantially no change in effective volume as the result of back and forth motion in it of the brake fluid pressure control unit; and consequently operation of the anti-skid device produces no fluctuation in pressure at the master cylinder that would be manifested as a feedback to the brake pedal.

If for any reason servo fluid pressure should fail when the servo piston is out of its innermost normal position, the head 62 of the poppet would of course remain engaged with its seat 64 on the sleeve member, preventing flow of brake fluid through the sleeve member bore. In that event, however, brake fluid could flow between the inlet chamber 34 and the outlet chamber 36 by an alternative route provided by a passage 73 through the partition 33. Normally the passage 73 is blocked by a security valve 74 which is maintained closed by pressurized servo fluid.

The passage 73 is substantially Z-shaped, having a medial portion that is coaxial with a counterbore 75 which opens laterally to the exterior of the housing and which slidably accommodates the valve element 76 of the security valve. The junction of said medial passage portion and the counterbore 75 provides a seat for the security valve. The actuator for the security valve comprises a cylinder member 77, threaded plug-fashion into stepped enlargements of the counterbore 75, and a piston 78 in said cylinder member, coaxially connected with the security valve. Fluid under servo system pressure is normally maintained in the cylinder member by means of a branch servo fluid duct 79 which is connected between the cylinder member and the servo fluid duct 50, and such servo fluid urges the piston 77 in the direction to maintain the security valve seated. In the event of loss of servo fluid pressure, pressure of brake fluid in the Z-shaped passage 73 forces the security valve off its seat, opening said passage to flow of brake fluid therethrough in bypass relation to the bore in the sleeve member and thus permitting normal operation of the brake system.

It will be evident that an electrical failure will likewise leave the brake system available for normal operation, since in that event the solenoid actuated valve spool 47 will remain in its normal position under the bias of its spring 46, and consequently the servo piston will remain in its normal inward position in which the poppet of the brake fluid pressure control unit has its head 62 spaced from the valve seat 64 on the sleeve member permitting flow of brake fluid through the bore in the sleeve member.

From the foregoing description taken with the accompanying drawings it will be apparent that this invention provides an anti-skid device for a hydraulic brake system wherein the volume of a chamber which is at all times communicated with the brake cylinder is controlled in accordance with braking requirements by a movable brake fluid pressure control unit that is servo actuated in both its volume increasing and its volume decreasing directions of motion, and that the device of this invention fails safe in that it permits normal brake operation in the event of either a servo system failure or an electrical failure.

What is claimed as our invention is:

1. An anti-skid hydraulic brake system for a rotatable member, of the type comprising a brake actuator responsive to pressurized brake fluid, a master cylinder for supplying brake fluid to the actuator under operator controlled pressure, and a monitoring device for producing an output upon excessive deceleration of the rotatable member, said brake system being characterized by:
   (A) servo means connected with the monitoring device and having a part which is moved in one direction away from a normal position in response to output from the monitoring device and which is moved in the opposite direction in response to cessation of such output;
   (B) a hollow body having a partition therein which defines
      (1) an inlet chamber communicated with the master cylinder to receive brake fluid under operator controlled pressure therefrom, and
      (2) an outlet chamber communicated with the brake actuator;
   (C) a tubular sleeve endwise slideable in a closely fitting bore through said partition and normally projecting a substantial distance into the outlet chamber,
      (1) the bore in said sleeve normally providing the sole communication between the said chambers, and
      (2) the end of said sleeve that is in the outlet chamber providing an annular valve seat;
   (D) a valve element having
      (1) an elongated stem that extends through the sleeve with substantial clearance so as not to interfere with communication between the chambers, and
      (2) an enlarged head in the outlet chamber which is engageable with said end of the sleeve; and
   (E) means connecting the valve element with said part of the servo means for motion therewith, said connecting means being so arranged that when said part is in its normal position the head of the valve element is spaced from the valve seat, but upon initial motion of the part in said one direction said head engages against said seat to prevent flow of fluid from the inlet chamber to the outlet chamber, and upon further motion in said direction the valve element pushes to the sleeve partway out of the outlet chamber to increase the effective volume thereof,
      said connecting means comprising a member coaxial with the valve stem and which extends through the inlet chamber and has a diameter equal to the outside diameter of the sleeve so that the effective volume of the inlet chamber remains substantially unchanged upon motion of the connecting means, valve element and sleeve.

2. The anti-skid hydraulic brake system of claim 1, wherein said monitoring device produces an electrical output and wherein the servo means comprises:
   (A) a second partition in said hollow body, at the side of the inlet chamber remote from the outlet chamber, through which said member of the connecting means slidably extends and which defines an actuating cylinder having ports at its opposite ends;
   (B) a piston in said actuating cylinder which comprises said part;
   (C) a two-position control valve having a pressure fluid port connectable with a source of fluid normally under substantially constant pressure, a return fluid port, and service ports communicated with said ports in the cylinder;
   (D) means biasing said control valve to a normal position in which it directs pressure fluid to the side of the piston that effects its movement in said one direction; and (E) an electromagnetic actuator for the control valve connected with the monitoring device to be energized by the output therefrom and energization of which effects movement of the control valve to its other position at which it provides for motion of the piston in said opposite direction.

3. The anti-skid hydraulic brake system of claim 2, further characterized by:

(A) the first designated partition having a passage therethrough by which the inlet and outlet chambers are communicable; and (B) a pressure responsive valve controlling said passage, said valve being connectable with said source of fluid normally under substantially constant pressure to be maintained closed by the pressure of such fluid.

4. The hydraulic brake system of claim 1, further characterized by:

(A) means yieldingly biasing the tubular sleeve toward the outlet chamber so that upon motion of the servo part in said opposite direction the sleeve follows the valve element and remains engaged with the head thereon; and (B) cooperating means on the sleeve and on the partition defining a limit of sliding motion of the sleeve in the direction toward the outlet chamber, so that the valve member is disengaged from the sleeve in the final stage of motion of said part in said opposite direction, after the sleeve has reached said limit of its sliding motion.

5. In a hydraulic brake system for a rotatable member, having a hydraulic actuator for a braking member engageable with the rotatable member, a master cylinder controllable by an operator for pressurizing hydraulic fluid to be supplied to the actuator, a monitoring device operatively associated with the rotatable member to produce an output when the rotatable member is decelerated too rapidly, and a servo device connected with the monitoring device and responsive to its output to produce motion of a part in one direction and to move said part in the opposite direction toward a normal position upon cessation of such output, means for relieving pressure of hydraulic fluid at the actuator in consequence of motion of said part in said one direction, said last named means comprising:

(A) a hollow body having
  (1) an inlet connectable with the master cylinder and
  (2) a chamber with an outlet connectable with the braking member actuator;

(B) a tubular sleeve slideable lengthwise in a wall in the body into and out of said chamber in the body, the bore in said sleeve providing for communication between said inlet in the body and said chamber, and the end of said sleeve that is in said chamber providing a valve seat;

(C) cooperating means on the body and on the sleeve defining a limit of motion of the sleeve into the chamber at which the sleeve projects a substantial distance into the chamber;

(D) a valve member in the chamber having a head cooperable with the valve seat on the sleeve to block flow of fluid therethrough; and (E) means providing a connection between the valve member and said part of the servo device by which motion of said part in its said one direction constrains the valve member to move axially of the sleeve, said connection being so arranged that with said part in its normal position and the sleeve at its said limit of motion the head on the valve member is spaced from the seat, but upon initial motion of the part in said one direction the valve head engages the seat, and further motion of the part in said direction decreases the amount by which the sleeve projects into said chamber to increase the effective volume of the chamber.

6. The hydraulic brake system of claim 5 wherein said inlet in the body opens to a second chamber therein and wherein said wall in the body comprises a partition between said chambers having a bore therethrough in which the sleeve is slideable, further characterized by:

(A) a stem on the valve member extending coaxially through the bore in the sleeve with a substantial clearance; and (B) the connection between the valve member and said part of the servo comprising a rod-like member rigidly coaxially secured to said stem, said rod-like member extending through the second chamber and having a diameter substantially equal to the outside diameter of the sleeve so that motion of it and of the valve member and sleeve causes no substantial change in the effective volume of said second chamber.

7. The hydraulic brake system of claim 6, further characterized by:

an axially adjustable stop member projecting into the first chamber and engageable by the valve member when said part is in its normal position to establish the spacing between the head on the valve member and the seat on said end of the sleeve.

References Cited
UNITED STATES PATENTS

| | | | |
|---|---|---|---|
| 3,093,422 | 6/1963 | Packer et al. | 303—21 |
| 3,486,800 | 12/1969 | Ayers | 303—21 |

MILTON BUCHLER, Primary Examiner

J. J. MCLAUGHLIN, JR., Assistant Examiner

U.S. Cl. X.R.

188—181; 303—6, 40, 61, 68

UNITED STATES PATENT OFFICE
CERTIFICATE OF CORRECTION

Patent No. 3,544,171  Dated December 1, 1970

Inventor(s) Lester, Waldermar & Lennart Swiden

It is certified that error appears in the above-identified patent and that said Letters Patent are hereby corrected as shown below:

Column 1, line 60, after "circuit" insert

--between the--

SIGNED AND
SEALED
MAR 16 1971

(SEAL)
Attest:

Edward M. Fletcher, Jr.
Attesting Officer

WILLIAM E. SCHUYLER, JR.
Commissioner of Patents